United States Patent
Ritthammer

(10) Patent No.: US 9,771,089 B2
(45) Date of Patent: Sep. 26, 2017

(54) CAR CONNECTION SYSTEM FOR GUIDING AT LEAST ONE SUPPLY CABLE

(71) Applicant: LEONI KABEL GMBH, Nuremberg (DE)

(72) Inventor: Marcus Ritthammer, Georgsmuend (DE)

(73) Assignee: LEONI Kabel GmbH, Nuremberg (DE)

( * ) Notice: Subject to any disclaimer, the term of this patent is extended or adjusted under 35 U.S.C. 154(b) by 0 days.

(21) Appl. No.: 15/462,292

(22) Filed: Mar. 17, 2017

(65) Prior Publication Data

US 2017/0190339 A1    Jul. 6, 2017

Related U.S. Application Data

(63) Continuation of application No. PCT/EP2015/071194, filed on Sep. 16, 2015.

(30) Foreign Application Priority Data

Sep. 19, 2014   (DE) ................. 10 2014 218 943

(51) Int. Cl.
*B61G 5/10*   (2006.01)
*H01B 9/00*   (2006.01)
*H02G 3/02*   (2006.01)

(52) U.S. Cl.
CPC .............. *B61G 5/10* (2013.01); *H01B 9/006* (2013.01); *H02G 3/02* (2013.01)

(58) Field of Classification Search
CPC ............. B61G 5/06; B61G 5/10; H02G 3/26

USPC .................................... 174/72 A, 79
See application file for complete search history.

(56) References Cited

U.S. PATENT DOCUMENTS 1,526,286 A  *  2/1925  Hornburg ................ B61G 5/10
                                                   439/195

FOREIGN PATENT DOCUMENTS

| CN | 201423930 Y | | 3/2010 |
|---|---|---|---|
| DE | 19614060 C1 | | 5/1997 |
| DE | 19614427 | * | 10/1997 |
| DE | 19614427 A1 | | 10/1997 |
| DE | 19705895 | * | 8/1998 |
| DE | 102006034303 | * | 8/2007 |
| FR | 2713183 A1 | | 6/1995 |

* cited by examiner

*Primary Examiner* — Timothy Thompson
*Assistant Examiner* — Michael F McAllister
(74) *Attorney, Agent, or Firm* — Laurence A. Greenberg; Werner H. Stemer; Ralph E. Locher

(57) ABSTRACT

A car connection system guides at least one supply cable between two cars and has a support part for mounting the supply cable. The support part has a separate connection point to which the supply cable can be electrically connected, and the support part is secured to an end closure. The car connection system is characterized in that the supply cable is configured as a spiral cable and extends about a cable longitudinal axis in a helical manner, the support part is rigid, and a clamping part is secured to the support part in order to relieve tension and mechanically support the supply cable.

15 Claims, 3 Drawing Sheets

CAR CONNECTION SYSTEM FOR GUIDING AT LEAST ONE SUPPLY CABLE

CROSS-REFERENCE TO RELATED APPLICATION

This is a continuation application, under 35 U.S.C. §120, of copending international application No. PCT/EP2015/071194, filed Sep. 16, 2015, which designated the United States; this application also claims the priority, under 35 U.S.C. §119, of German patent application No. 10 2014 218 943.8, filed Sep. 19, 2014; the prior applications are herewith incorporated by reference in their entireties.

BACKGROUND OF THE INVENTION

Field of the Invention

The invention relates to a car connection system for guiding at least one supply cable between two cars, having a supporting part for holding the supply cable.

Such a car connection system is described, for example, in French patent FR 2 713 183.

In particular in the rail sector, so-called car connection systems, which guide the supply cable from one car to another, are used to convey supply cables between two cars of a train. The supply cable, in this connection, is, for example, a cable for power transmission, in particular in the kilovolt range, or a data or signal cable. In this case, it is also possible, in principle, for several supply cables to be guided by one car connection system.

A car connection system additionally also provides a flexible connection in such a manner that a relative movement between the two cars with respect to one another is made possible. For example, fastening the two cable ends of a supply cable on an end closure in each case by a cable shoe is generally known. The supply cable, in this case, is usually flexurally flexible and enables a relative movement of the end closures which are in each case mounted fixedly on a car.

A disadvantage in the case of the realization, however, is that mechanical forces possibly occur additionally in operation on the respective cable shoe, that is to say at the connection points of the supply cable, and as a result of said forces the connection is loosened or even detached or the supply cable is damaged and breaks. The mechanical stress acts here, in particular, directly on the supply cable as well as, in particular, on the connection points. In order to separate the electrical attachment of the supply cable via the connection points from the mechanical stress, so-called clamping parts are often consequently used in which the supply cable is fixedly fixed mechanically in such a manner that the connection points are not stressed at all or are only stressed slightly in operation.

Thus, for example, German patent DE 196 14 060 C1 shows an electric coupling device for vehicles with two vehicle parts which are movable relative to one another. In this case, a supply cable, designated here as an elastic coupling element, is first of all fixed by a clamping element. The clamping element is connected, in turn, to a cantilever which is mounted so as to be pivotable on a supporting part realized as an insulator. A mechanical attachment to one of the vehicle parts is then effected by the supporting part. An electrical connection, to which the supply cable is electrically connected by a cable shoe, is additionally fixedly connected to the supporting part. A corresponding end closure is then connectable, in turn, to the electrical connection, for attaching the supply cable electrically to the vehicle part.

French patent FR 2 713 183 shows a device which enables a flexible connection in a horizontal plane and, for this purpose, includes a telescopic arm which is mounted by a joint on an insulator at each of the two ends thereof. The guiding of a supply cable is effected here by a guide device which is mounted approximately centrally on the telescopic arm and serves as mechanical stabilization for the supply cable. To this end, it is realized as an O-ring which contains an inside diameter which is greater than the diameter of the supply cable in order to enable a relative displacement of the same in relation to the guide device and consequently to the telescopic arm. In addition, the joints comprise in each case a plate which is rigidly connected to a respective insulator and to which the supply cable is electrically connected.

In addition, German patent DE 196 14 427 C2 describes a coupler connector with a telescopic rod.

SUMMARY OF THE INVENTION

The object underlying the invention is to provide a simpler and at the same time more reliable car connection system for guiding a supply cable. In this case, simpler is to be understood, in particular, as a simplified constructive outlay, and more reliable, in particular, as ensuring the electrical connection points of the supply cable are relieved from mechanical stress. In addition, the car connection system is to be as cost-efficient as possible in production.

The object is achieved according to the invention by a car connection system with the features of the main claim. Advantageous designs, further developments and variants are the object of the sub claims.

The car connection system serves for guiding at least one supply cable between two cars, for example of a train. For holding the supply cable, the car connection system includes a supporting part which additionally contains a separate connection point, to which the supply cable is electrically connectable. Furthermore, the supporting part is fastened on an end closure, in particular for attaching the supply cable electrically to one of the cars and in particular also for attaching the clamping part and the supporting part mechanically to the cars. The supply cable is realized as a spiral cable and extends in a helical manner around a cable longitudinal axis. In addition, the clamping part is fastened on the supporting part, to relieve strain and to hold the supply cable mechanically. The supporting part is additionally realized in a rigid manner, i.e. does not contain any parts which move with respect to one another.

Particularly important, on the one hand, is that both the mechanical and the electrical interface to the respective car is effected via the supporting part. The supporting part is attached mechanically and electrically to the end closure for this purpose. Consequently, by means of the supporting part, both the electrical and the mechanical fastening are affected indirectly via the end closure with only one component. An additional mechanical holder or an additional electrical contact element is not necessary and neither is it provided.

Particularly important, in addition, is that at the same time the mechanical attachment of the supply cable is separated from the electrical attachment. In particular, the connecting point of the supply cable, which is particularly sensitive in relation to mechanical stresses, does not experience any application of force at the connection point in operation or experiences just a small amount. Possible forces acting on the supply cable are instead absorbed by the clamping part.

A particularly simple connection both mechanically and electrically to one of the cars is made possible therefore as a result of fastening the rigid supporting part on the end closure. The overall combined attachment via the supporting part results in a particularly simple realization of the car connection system, in particular the electrical connection point being held free of mechanical stress on account of the separation between the holding and the electrical connection of the supply cable on the supporting part. Overall, the supporting part acts as a mechanical intermediary between the clamping part and the end closure, which are not connected together directly, but just indirectly via the supporting part. The supporting part, itself, does not comprise, in this connection, any parts which are movable with respect to one another and, as a result, is particularly sturdy mechanically. In particular, the respective fastening on the supporting part is also rigid such that the clamping part and the end closure are not movable either with reference to the supporting part and overall a particularly robust arrangement is produced.

The supply cable is indirectly fastened on the supporting part for holding, which is to say on the clamping part, which is connected, in turn, in a mechanically fixed and rigid manner to the supporting part. In particular, the supply cable is fastened to at least one holding point, for example a portion of the supply cable is clamped or fixed in a suitable feedthrough or recess. This means in particular: the supply cable is held in a slip-resistant manner on the supporting part by means of the clamping part. In this way, forces acting on the supply cable in operation are forwarded to the clamping part and the supporting part. In an advantageous manner, no more forces then act on the cable portion located between the clamped portion of the supply cable, that is to say the holding point and the connection point. As a result, in particular no forces act on the connection point either or simply low forces act thereon. In the case of a helical supply cable, torsion forces, in particular, are distributed advantageously to the windings of the supply cable and do not act on the connection point. In this case, the holding point and the connection point are certainly arranged spatially separated from one another on the supporting part, but expediently are not movable relative to one another. As a result, such stresses which act on the cable portion located between the points as well as on the connection point are optimally avoided.

In general, where the supply cable is fastened at the separate connection point, it is additionally possible, on account of the reduced mechanical requirements, when selecting the fastening methods to select them primarily with consideration to the costs and/or the production outlay; the mechanical stability of the connection is advantageously of subordinate importance.

The supply cable is additionally realized as a spiral cable which contains a plurality of windings. These form, in particular, a helix which extends around the cable longitudinal axis. Each of the windings, in this case, with reference to the cable longitudinal axis, contains a pitch angle, also designated as pitch, which is preferably at least 60° and is less than 90°. As a result of the steep realization of the spiral cable, particularly advantageous mechanical characteristics are produced. Mechanical stress, in particular torsion, is distributed, in particular, over several windings of the supply cable, as a result of which, in particular, the stress acting on the clamping part is also reduced. As a result, it is once again advantageously possible to dispense with additional holding means.

For holding the supply cable as well as for relieving strain, a clamping part is fastened on the supporting part. The holding of the supply cable on the supporting part is particularly advantageous resulting in the clamping part being producible from a different material to the supporting part. As a result of the separate formability of the clamping part and the supporting part, it is possible to shape the two parts in each case primarily with regard to the respective function. With regard to the clamping part, in particular such designs which enable the supply cable to be fixed in a particularly good manner as well as mechanical stresses to be absorbed in a suitable manner, are possible as a result. The supporting part is produced from a conducting material, for example metal, in particular on account of the electrical attachment of the supply cable. The clamping part is preferably also produced from metal, as an alternative to this, however, from a plastics material. In particular, the clamping part includes two half shells which form at least one feedthrough in which the supply cable is clamped or sits. As a result, it is then in particular possible to realize the feedthroughs in a particularly custom-fitting manner and consequently to obtain a fixing of the supply cable in the feedthrough based on friction. Disadvantageous crimping of the supply cable for holding the same is avoidable.

The clamping part is screw-connected, for example, to the supporting part. With reference to the electrical connection point on the supporting part, the clamping part then creates a suitable holding point for the supply cable which is spatially separated from the connection point.

In an expedient design, the supporting part contains two legs and positions the end closure and the supply cable at a predefined angle with respect to one another, which is in particular not a right angle. As a result, it is in particular possible to adapt the car connection system in a suitable manner to the respective area of application. The angle is preferably greater than 90° and smaller than 180° and in a particularly preferred manner is within the range of approximately between 110 and 160°. In this case, the angle is, in particular, the angle which is enclosed by the cable longitudinal axis and a longitudinal or extension direction of the end closure. The clamping part is fastened, in this case, on the one leg. As a result of the angled design, the clamping part is fastened mechanically in a particularly robust manner. As a result of the angle chosen, the one leg is preferably oriented approximately parallel to a plane which is defined by a spiral winding of the spiral cable. Simple mechanical decoupling via the clamping part is promoted as a result.

For fastening the clamping part on the supporting part, the supporting part consequently preferably contains a vertical mounting surface on which the clamping part is fastened and which extends substantially perpendicularly to the cable longitudinal axis of the supply cable.

This is to be understood, in particular, as the arrangement of the mounting surface deviating by no more than approximately 10° from a perpendicular arrangement relative to the cable longitudinal axis. As a result, the mounting surface provides a particularly large contact surface for the clamping part and the car connection system is designed in a particularly robust manner. The mounting surface, in this case, is formed, in particular, by the one leg.

The clamping part also expediently contains a corresponding vertical mounting surface which, in the fastened state, abuts against the vertical mounting surface of the supporting part. The vertical mounting surface of the clamping part is formed, in particular by an outwardly pointing outer surface of one of the half shells of the clamping part. In this case, the mounting surface of the clamping part does not serve precisely as a clamping surface for the supply cable, but rather abuts in a planar manner against the supporting part. For holding the supply cable, the clamping part contains a number of, in particular, several additional separate clamping surfaces. In the case of a fastening by a screw connection, the screws then extend parallel to the cable longitudinal direction and through the two vertical mounting planes.

The end closure is expediently fastened on the supporting part via an angled mounting surface of the supporting part which is different to the vertical mounting surface. In particular, the two mounting surfaces of the supporting part are in each case part of one of the above-described legs such that, therefore, the angled and the vertical mounting surfaces are also arranged at a corresponding angle with respect to one another, namely an angle of 180° less the above-named angle between the cable longitudinal axis and the longitudinal axis of the end closure.

As the supporting part is realized in a rigid manner, the angled and vertical mounting surfaces thereof are also arranged rigidly with respect to one another, i.e. at a fixedly set angle with respect to one another. The angle is set then, in particular, during the production of the supporting part, for example according to customer specification, and is not changed again subsequently.

The two mounting surfaces extend in each case, in particular, in a straight, flat and even manner.

The two mounting surfaces and consequently, in particular, the two legs are connected together rigidly in particular by a number of side parts. In a preferred manner, the connection point is arranged on one of the side parts and precisely not on one of the mounting surfaces such that any mechanical stress on the fastening points from the end closure and from the clamping part is kept as far away as possible from the connection point. The electrical connection of the supply cable is effected accordingly on a side part of the supporting part and precisely not in the region of a mounting surface.

In an equally suitable variant, the two mounting surfaces of the supporting part extend parallel to one another and are, in particular, a front and a rear side of the supporting part, in particular in a design as a sheet metal part, the two mounting surfaces are then arranged on opposite sides of the sheet metal. Overall, a particularly compact model is produced in the design. The two mounting surfaces of the supporting part are then, in particular, also arranged parallel to one another and, in particular, are spaced apart from one another simply by the material thickness. In this case, in particular contrary to the above-described variant, the connection point for the supply cable, the fastening point for the end closure and possible fastening points for the clamping part are all arranged in a common plane, in particular inside the mounting surfaces. The design is particularly suitable for an arrangement where the longitudinal axis of the end closure extends parallel to the cable longitudinal axis. On the edges of the mounting surfaces, in one variant the supporting part nevertheless contains a number of side parts which then do not serve for connecting the mounting surfaces, but are hinged downward or beveled as side wings and thus, in particular in the case of a supporting part produced from metal sheet, contribute to the mechanical stability.

For the mechanical attachment to one of the cars, the supporting part, in an expedient design, is simply attached to the car by the end closure. In this case, the supporting part itself is not mechanically connected to the car but simply indirectly via the end closure. In other words: the supporting part contains no further mechanical attachment to the corresponding car apart from the end closure. The application of force transferred from the supply cable to the supporting part is consequently forwarded to the end closure. In the design, it is advantageously possible to dispense with a separate and consequently expensive mechanical attachment of the supply cable to the car, in particular by means of a separate insulator. The car connection system is consequently realized in a clearly simpler manner and, in particular, is also more cost-efficient in production.

The supporting part preferably does not contain any mechanical connection to the other one of the two cars either, apart from the supply cable. The supply cable consequently provides the single mechanical connection between the two cars with reference to the car connection system. As a result, it is in particular possible to dispense with possibly complex connection parts.

The end closure includes, in particular, a conductor with a connection contact for the electrical attachment as well as an insulation housing which surrounds the conductor. The connection contact, in this connection, expediently includes a bolt which is provided with an external thread. The end closure is preferably designed to transmit high voltages, for example in the kilovolt range, and the insulation housing is correspondingly formed in the manner of an insulator. Such an end closure, on account of the usually rigid design thereof, is also particularly suited for transmitting mechanical stresses. The end closure accordingly advantageously fulfills a dual function in such a manner that the conductor thereof produces an electrical connection between supporting part and electrical components of the car and, at the same time, enables a rigid, mechanical attachment. In this case, the attachment is effected advantageously via the connection contact, in particular via the particularly sturdy bolt. The connection contact is fastened on the supporting part for this purpose and is preferably screw-connected to the supporting part by the bolt.

At the same time the supporting part is also connected in particular electrically to the end closure via the connection contact. In operation, current then flows in particular from the supply cable via the connection point into the supporting part and from there into the end closure and to the car. The direct attachment of the supply cable to the end closure mentioned in the introduction is avoided in this connection.

In a preferred configuration, the supply cable is screw-connected to the supporting part by a cable shoe which is fastened on the cable. The form of connection is particularly cost-efficient and in particular is made possible as a result of the connection point not having to meet any high mechanical demands. Consequently, it is also possible to use a cable shoe produced from copper, which is not usually used for mechanically stressed connections, but is distinguished by particularly good electric characteristics. The cable shoe is mounted, for example crimped, in particular on the cable end of the supply cable. The cable shoe is preferably pressed, for example by a hexagonal outer contour, as a result of which, in particular in the radial direction with reference to the conductor of the supply cable, a particularly uniform distribution of force is produced during pressing and, as a result, a particularly suitable holding action is achieved. The connection on the supporting part is effected then, for example, as a result of a screw being screwable through the cable shoe into a suitable hole in the supporting part. In this case, the hole is, for example, a simple through-hole and the screw connection a particularly simple and cost-efficient screw/nut connection.

In a preferred manner, the cable end is realized in a curved manner, as a result of which the helical supply cable can be attached to the supporting part in a particularly simple manner. The supporting part is realizable in a particularly simple manner as a result, that is to say, in particular, that no additional cantilevers or terminal buses have to be formed thereon or fastened thereto. In addition, the curved realization allows for a certain play in the case of particularly serious stresses. For example, in the event of the supporting part or the clamping part bending or breaking, an electrical connection initially continues to be ensured.

In a preferred further development, the car connection system is realized for guiding several supply cables, in particular two or three supply cables, wherein each of the several supply cables is connected electrically to the supporting part. As a result, the transmittable power of the car connection system is scalable in a particularly simple manner. In place of one supply cable with an increasing cross section which is more difficult to produce, several supply cables are then used with, compared thereto, a smaller cross section. The realization with several supply cables, additionally in the case of the direct fastening on the end closure described in the introduction, is not necessarily straightforward as, in this connection, the different supply cables obstruct one another on account of the common fastening on the end closure. In other words: the guiding of the supply cable is made more difficult on account of the common connection point which at the same time also provides the mechanical attachment. In the described preferred further development, the supply cables are not held at the connection point, but elsewhere on the supporting part, in particular by the clamping part, as a result of which guiding several supply cables is clearly simplified. In an advantageous manner, it is then possible to use wound supply cables which comprise, in particular, clearly greater flexibility than, for example, simple, straight supply cables. Consequently, in a preferred design, the several supply cables are realized in each case as spiral cables which extend in a helical manner around a cable longitudinal axis.

When using several supply cables, they extend suitably in a helical manner around a common cable longitudinal axis. This produces the advantage of a supply cable which possibly becomes loose or breaks off being caught by at least one of the remaining supply cables, that is to say being prevented from falling off. As a result, in particular the safety of the car connection system is improved.

In order to ensure, in particular, a suitable mechanical connection between the end closure and the supporting part, it contains a recess into which the end closure is inserted. In this case, the end closure is inserted in such a manner into the supporting part that there is also an electrical connection present. In the case of a suitable end closure, the conductor thereof is rigidly connected to the insulating insulation housing of the end closure. In the realization, the corresponding conductor end just then needs to be inserted into the recess in order to produce both a mechanical and an electrical connection.

The recess in the supporting part is expediently provided with an internal thread, into which the end closure is screwed in particular by the connection contact thereof, the connection contact suitably including a bolt with an external thread. As an alternative to this or in addition to it, a nut, which in this case is in particular a lock nut, is then advantageously screwed on the bolt.

In a particularly cost-efficient design, the supporting part is preferably produced from sheet metal, for example from steel or stainless steel plate. Such a supporting part is additionally particularly simple to produce. In this case, for example, a suitable contour is trimmed from a metal sheet and then folded in such a manner that suitable mounting surfaces are formed for the attachment of the clamping part and the end closure. So that the car connection system is suitable, in particular, for use in the rail sector and the supporting part withstands the mechanical stresses possibly occurring there, the material thickness of the sheet metal in a preferred manner is between 4 mm and 10 mm. The connection contact of the end closure inserted into the recess contains, in a preferred manner, a length which is greater than the thickness of the sheet metal, for example approximately 30 mm, such that the connection contact projects through the recess in the carrier part and a lock nut can be screwed thereon.

The supporting part is expediently realized in one piece, as a result of which it is particularly sturdy mechanically. In particular, parts which are movable relative to one another and are possibly susceptible to wear in operation, are dispensed with in this connection. Such a supporting part is then particularly low in wear and low in maintenance.

In an advantageous variant, both cable ends of the supply cable are connected in the above-described manner. In this connection, to close both cable ends of the supply cable, the car connection system consequently contain an end closure with a supporting part fastened thereon for each of the cable ends. As a result, it is then in particular possible to utilize the above-described advantages on both sides of the car connection system. The design is also designated in particular as a symmetrical realization, in contrast to an asymmetrical realization where, for example, just one side of the car connection system is realized in the conventional manner. The two supporting parts are, in particular, not connected together mechanically in a direct manner, but purely by the supply cable. The car connection system accordingly preferably does not contain any connecting part which connects the carrier parts, as such a part possibly results during operation in damage to the supply cable as a result of friction at the connecting part.

The statements made above are, in particular, not restricted to the railway sector, but are also applicable generally to the guiding of a supply cable between two units which are movable relative to one another, for example in the case of robot systems or other production machines where a movable and a stationary part are connected together by a supply cable. The above statements are consequently, in particular, not to be seen as limited to a car connection system for the rail sector.

Other features which are considered as characteristic for the invention are set forth in the appended claims.

Although the invention is illustrated and described herein as embodied in a car connection system for guiding at least one supply cable, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
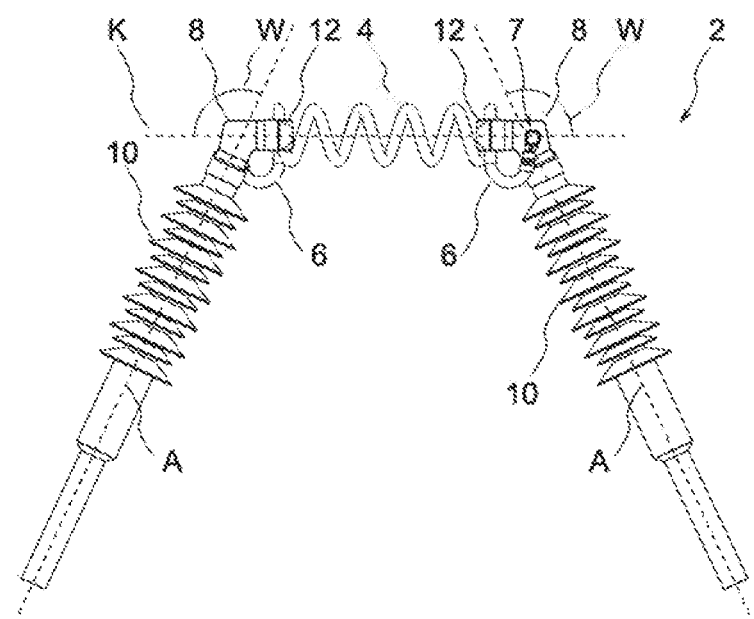
FIG. 1 is a diagrammatic, side view of a car connection system according to the invention.

Referring now to the figures of the drawings in detail and first, particularly to FIG. 1 thereof, there is shown a schematic representation and a side view of a car connection system 2. This serves for transmitting electric power between two cars (not shown in any detail here) of a train (not shown either). The transmission is effected in this connection by a supply cable 4, which is realized here as a spiral cable or also helix cable and extends in a helical manner around a cable longitudinal axis K. Cable ends 6 of the supply cable 4 are in each case connected electrically to a connection point 7 of a supporting part 8. An end closure 10, which in each case provides a mechanical as well as electrical attachment to one of the cars, is additionally connected in each case to the supporting parts 8. The car connection system 2 shown is additionally realized here in a symmetrical manner.

For fixing the supply cable 4, a clamping part 12 is fastened in each case on the supporting parts 8. On account of the fastening, the supply cable 4 is consequently also held on the supporting part 8. The clamping parts 12 are arranged here facing one another and the supply cable 4 extends in a helical manner between them. The fixing as a result of the clamping parts 12 is particularly clear in combination with FIG. 2. This shows a top view of a cutout from the arrangement according to FIG. 1. The clamping part 12, which is screw-connected to the supporting part 8 and serves for fixing the supply cable 4, can be clearly seen here. To this end, the clamping part 12 is produced from two half shells 12a, 12b which, in the connected state, realize two feedthroughs 14 through which the supply cable 4 is guided. In the realization shown here, the supply cable 4 extends in each case perpendicularly to the cable longitudinal axis K into the respective clamping part 12. The feedthroughs 14, in this case, provide, in particular, holding points at which the supply cable 4 is held, as a result of which possible mechanical stress to which the same is subjected is transmitted to the clamping part 12. The cable end 6 does not then experience any mechanical stress or simply experiences low mechanical stress. The cable end 6 is then attached on the supporting part 8, in the exemplary embodiment shown here by a cable shoe 16 which is pressed onto the supply cable 4 and is fastened on the supporting part 8 by a screw 18 and a nut 20.

Figure 2:
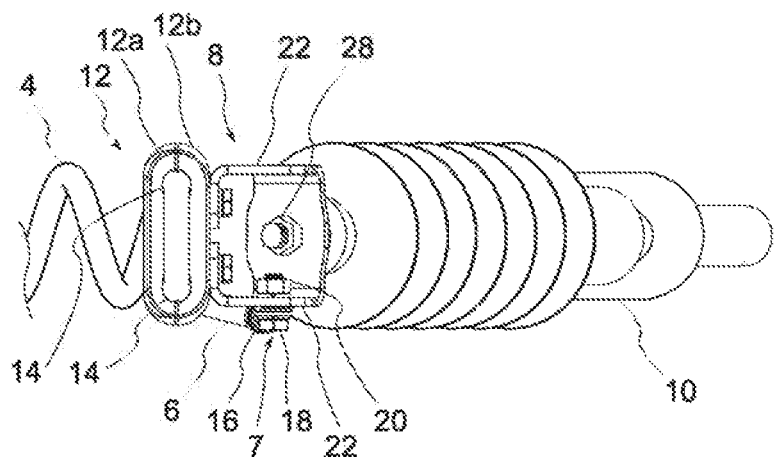
FIG. 2 is a top, perspective view of a cutout from the car connection system.
Figure 3:
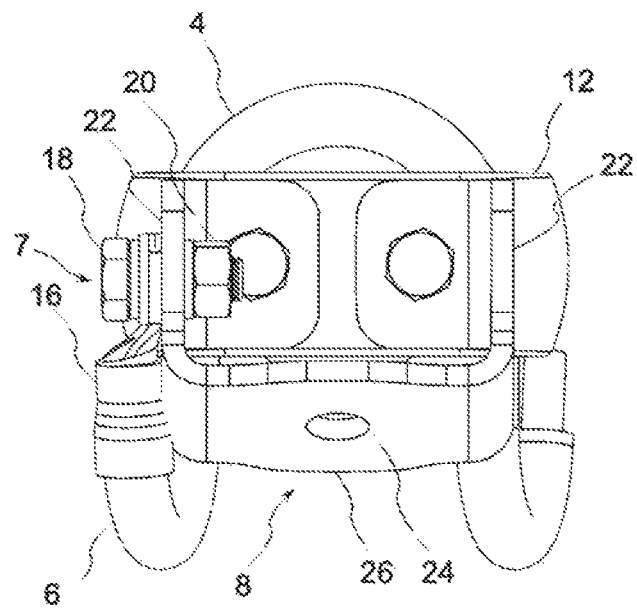
FIG. 3 is a perspective view of the supporting part according to FIG. 1 with the supply cable connected thereto.

This can be seen particularly clearly in FIG. 3, which shows a rear view of the arrangement of FIG. 2 without the end closure 10. The screw 18 sits in the cable shoe 16 and in a wing 22 of the supporting part 8 and is locked by way of the nut 20. A recess 24 in a center part 26 of the supporting part 8 can also be seen clearly here. The recess 24 serves, in particular, for holding the end closure 10. To this end, the end closure 10, as shown in FIG. 2, is inserted into the recess 24 with an electrical connection contact 28. In the exemplary embodiment shown here, the connection contact 28 includes a bolt or also a pin, which is provided with an external thread and is inserted into the recess 24 which is realized as a through-hole. A lock nut is then screwed onto the bolt for fastening. The supply cable 4 is not directly connected to the connection contact 28 electrically here but simply indirectly by means of the supporting part 8.

Figure 4:
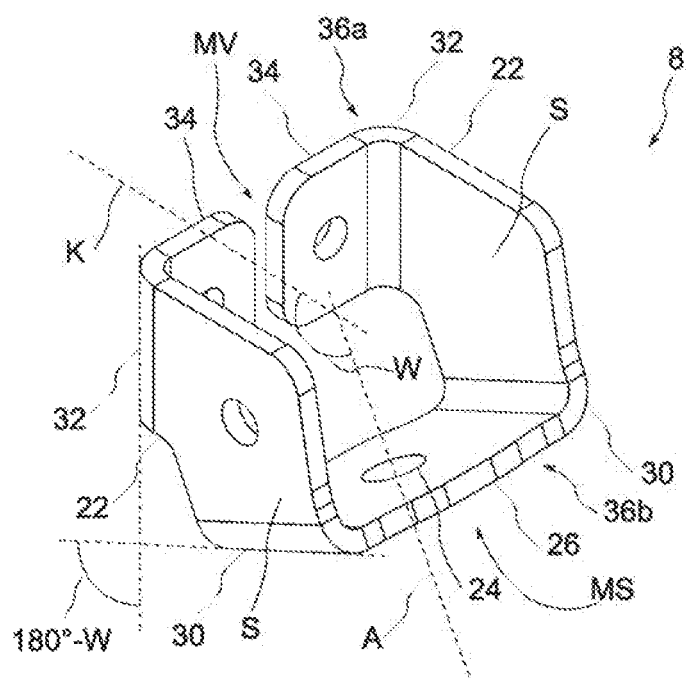
FIG. 4 is a perspective view of the supporting part according to FIG. 1.

FIG. 4 shows an oblique view of the supporting part 8. In the exemplary embodiment shown here, the supporting part 8 is produced in one piece and from a metal sheet. To this end, a suitable contour is trimmed first of all from a flat metal sheet and this is then given its final form by suitable edgings 30, 32. First of all, in this connection, a mounting wing 34 is bent off in each case by means of the edgings 32 and then, proceeding from the center part 26, the wings 22 are bent off as side parts S by the edgings 30. The two mounting wings 34 then form a vertical mounting surface MV which extends substantially perpendicularly to the cable longitudinal axis K and by means of which, in particular, the clamping part 12 is then mounted. The end closure 10, in contrast, is fastened on the center part 26 which correspondingly realizes an angled mounting surface MS. The recess 24 is realized to this end in particular as a through-hole such that the end closure 10 is screw-connectable onto the supporting part 8.

The supporting part 8 includes two legs 36a, 36b which are arranged at an angle W with respect to one another. In the exemplary embodiment shown here, the edgings 30, 32 are realized correspondingly angled with respect to one another for realizing the legs 36a, 36b and enclose, in particular, an angle 180°-W. As a result, the angled mounting surface MS and the vertical mounting surface MV, i.e. the mounting wings 34, are in particular also arranged with reference to the center part 26 at an angle of 180°-W, which is correspondingly produced as the difference resulting from a half angle of 180° and the above-described angle W. Particularly in combination with FIG. 1, it is clear that the end closures 10 are arranged in an angled manner with reference to the progression of the supply cable 4. In particular, the end closures 10 extend in each case along an axis A which then encloses the angle W with the cable longitudinal axis K. In the realization shown here, the angle W is approximately 120°. The two mounting surfaces MS, MV which are arranged in an angled manner with respect to one another are then connected together rigidly via the side parts S. The connection point 7 is then arranged on one of the side parts S.

Figure 5:
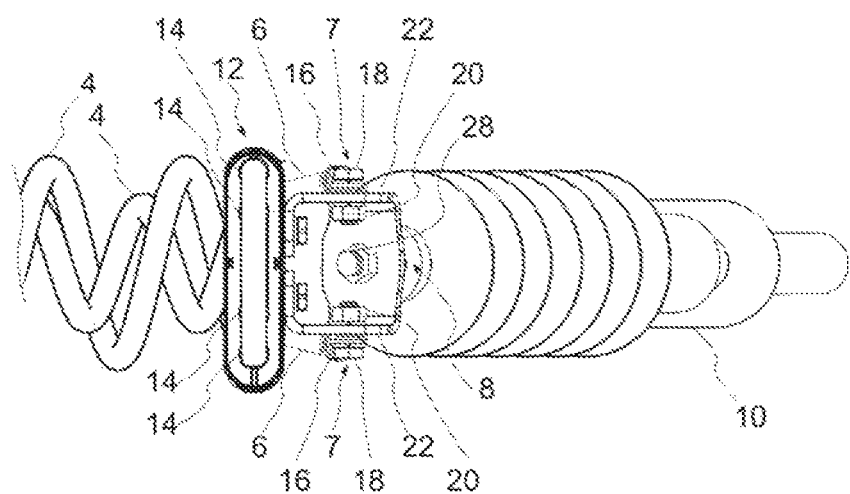
FIG. 5 is a perspective view of an alternative design of the car connection system.

FIG. 5 shows an alternative design of the arrangement according to FIG. 2 where the car connection system 2 is realized for guiding several, here two, supply cables 4. In a corresponding manner, the clamping part 12 contains here four feedthroughs 14 and the supporting part 8 two connection points 7 for the electrical connection of the supply cables 4. In addition, one of the supply cables 4 is arranged inside the other of the supply cables 4, as a result of which, in combination with the helical progression, protection against one of the supply cables 4 falling out is produced in such a manner that, in such an event, it will be caught by the windings of the other supply cable 4.

The following is a summary list of reference numerals and the corresponding structure used in the above description of the invention:

2 Car connection system
4 Supply cable
6 Cable end (of the supply cable)
7 Connection point
8 Supporting part
10 End closure
12 Clamping part 12a,12b Half shell
14 Feedthrough
16 Cable shoe
18 Screw
20 Nut
22 Wing
24 Recess
26 Center part
28 Connection contact
30,32 Edging
34 Mounting wing
36a,36b Leg
A Axis
K Cable longitudinal axis
MS Angled mounting surface
MV Vertical mounting surface
S Side part
W Angle

The invention claimed is:

1. A car connection system for guiding a cable between two cars, the car connection system comprising:
   a supply cable being a spiral cable and extending in a helical manner around a cable longitudinal axis;
   an end closure;
   a clamping part; and
   a supporting part for holding said supply cable, said supporting part having a separate connection point to which said supply cable is electrically connectable, said supporting part is fastened on said end closure, said supporting part being rigid and said clamping part is fastened on said supporting part to relieve strain and hold said supply cable mechanically.

2. The car connection system according to claim 1, wherein said supporting part has two legs and positions said end closure and said supply cable at a predefined angle with respect to one another.

3. The car connection system according to claim 1, wherein said supporting part has a vertical mounting surface on which said clamping part is fastened and which extends substantially perpendicularly to the cable longitudinal axis of said supply cable.

4. The car connection system according to claim 3, wherein said supporting part has an angled mounting surface and said end closure is fastened on said supporting part by means of said angled mounting surface, said angled mounting surface is disposed at an angle with reference to said vertical mounting surface.

5. The car connection system according to claim 2, wherein said support part has side parts, said two legs are connected together rigidly by means of a number of said side parts and said separate connection point is disposed on one of said side parts.

6. The car connection system according to claim 1, wherein for mechanical attachment to one of the cars, said supporting part is attached to the car simply by means of said end closure.

7. The car connection system according to claim 1, further comprising a cable shoe, said supply cable is screw-connected to said supporting part by means of said cable shoe which is fastened on said supply cable.

8. The car connection system according to claim 1, wherein said supply cable has a cable end and said cable end is realized in a curved manner.

9. The car connection system according to claim 1, wherein said supply cable is one of a plurality of supply cables connected electrically to said supporting part.

10. The car connection system according to claim 9, wherein said plurality of supply cables are connected to said supporting part in a purely electrical manner at least said separate connection point and are held elsewhere on said supporting part by means of said clamping part.

11. The car connection system according to claim 9, wherein said plurality of supply cables extend in a helical manner around a common cable longitudinal axis.

12. The car connection system according to claim 1, wherein said supporting part has a recess formed therein and into said recess said end closure is inserted.

13. The car connection system according to claim 1, wherein said supporting part is produced from sheet metal.

14. The car connection system according to claim 1, wherein said supporting part is realized as a one piece part.

15. The car connection system according to claim 1, wherein:
   said supply cable has two cable ends; and
   said supporting part is one of two supporting parts each having one said end closure, one of said supporting parts is fastened thereon to each of said cable ends.

* * * * *